US012685376B2

(12) United States Patent
Oikaze et al.

(10) Patent No.: US 12,685,376 B2
(45) Date of Patent: Jul. 21, 2026

(54) BEAUTY EQUIPMENT

(71) Applicant: Panasonic Intellectual Property Management Co., Ltd., Osaka (JP)

(72) Inventors: Hirotoshi Oikaze, Shiga (JP); Yuki Chikazawa, Nara (JP); Masato Kinoshita, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 346 days.

(21) Appl. No.: 18/254,539

(22) PCT Filed: Dec. 24, 2021

(86) PCT No.: PCT/JP2021/048147

§ 371 (c)(1),
(2) Date: May 25, 2023

(87) PCT Pub. No.: WO2022/168490

PCT Pub. Date: Aug. 11, 2022

(65) Prior Publication Data

US 2024/0000209 A1 Jan. 4, 2024

(30) Foreign Application Priority Data

Feb. 5, 2021 (JP) ................................ 2021-017273

(51) Int. Cl.
*A45D 20/12* (2006.01)
*A45D 20/08* (2006.01)
*B05B 9/08* (2006.01)

(52) U.S. Cl.
CPC ............ *A45D 20/12* (2013.01); *A45D 20/08* (2013.01); *B05B 9/0822* (2013.01)

(58) Field of Classification Search
CPC ..... B05B 9/0822; B05B 7/1613; B05B 7/162; B05B 7/1626; B05B 7/164; B05B 7/1646; B05B 7/1693; A61M 35/003; A61M 35/25

(Continued)

(56) References Cited

U.S. PATENT DOCUMENTS 3,947,659 A * 3/1976 Ono ...................... A45D 20/00 392/404
4,114,022 A * 9/1978 Braulke, III .......... A45D 20/00 239/137

(Continued)

FOREIGN PATENT DOCUMENTS

CN 202890940 U * 4/2013
CN 108937059 A 12/2018

(Continued)

OTHER PUBLICATIONS

International Search Report issued on Mar. 8, 2022 in International Patent Application No. PCT/JP2021/048147, with English translation.

(Continued)

*Primary Examiner* — Alex M Valvis
(74) *Attorney, Agent, or Firm* — Rimon P.C.

(57) ABSTRACT

Hair care device includes: housing including suction port and discharge port; heater disposed inside housing; and spray including two-fluid nozzle that discharges an atomized liquid. Housing includes, inside housing, air blow flow channel disposed between suction port and discharge port, and branch flow channel disposed below air blow flow channel. Heater is disposed in air blow flow channel, and spray is disposed in branch flow channel.

3 Claims, 7 Drawing Sheets

(58) Field of Classification Search
USPC .............. 239/128–139; 392/384, 494; 34/91, 34/96–98
See application file for complete search history.

(56) References Cited

U.S. PATENT DOCUMENTS

| | | | | |
|---|---|---|---|---|
| 4,605,019 | A * | 8/1986 | Reynolds | A45D 20/12 34/96 |
| 5,642,570 | A * | 7/1997 | Lee | B05B 7/2416 34/98 |
| 2006/0201016 | A1 * | 9/2006 | Nakagawa | B05B 5/0255 34/96 |
| 2010/0072303 | A1 | 3/2010 | Hayakawa | |
| 2017/0050203 | A1 | 2/2017 | Watanabe | |
| 2018/0249803 | A1 | 9/2018 | Matsui et al. | |
| 2018/0339303 | A1 * | 11/2018 | Inoue | B05B 9/0822 |

FOREIGN PATENT DOCUMENTS

| | | | |
|---|---|---|---|
| JP | 2004-222751 | A | 8/2004 |
| JP | 2009-006217 | A | 1/2009 |
| JP | 2010-075412 | A | 4/2010 |
| JP | 2013-102772 | A | 5/2013 |
| JP | 2015-211713 | A | 11/2015 |
| JP | 06363388 | B2 | 7/2018 |
| JP | 2018-143283 | A | 9/2018 |
| JP | 2018-196862 | A | 12/2018 |
| JP | 2019-072191 | A | 5/2019 |

OTHER PUBLICATIONS

English Translation of Chinese Search Report dated Jun. 30, 2025 for the related Chinese Patent Application No. 202180089691.5.

* cited by examiner

BEAUTY EQUIPMENT

CROSS-REFERENCE OF RELATED APPLICATIONS

This application is the U.S. National Phase under 35 U.S.C. § 371 of International Patent Application No. PCT/JP2021/048147, filed on Dec. 24, 2021, which in turn claims the benefit of Japanese Patent Application No. 2021-017273, filed on Feb. 5, 2021, the entire disclosures of which Applications are incorporated by reference herein.

TECHNICAL FIELD

The present disclosure relates to beauty equipment.

BACKGROUND ART

PTL 1 discloses a mist spray device (a spray) that atomizes and sprays a liquid. The mist spray device includes a vibration plate that includes an atomizer having a plurality of micropores, a vibration generator that vibrates the vibration plate, and a supplier that supplies a liquid to the atomizer. In this mist spray device, the liquid supplied to the atomizer is atomized by vibration of the vibration plate and is sprayed. In addition, this mist spray device further includes a heating element, and the heating element is used to heat the atomizer.

CITATION LIST

Patent Literature

PTL 1: Japanese Patent No. 6363388

SUMMARY OF THE INVENTION

In the mist spray device in the prior art, when the atomizer is heated by the heating element, not only the atomizer but also the surrounding liquid is heated at the same time, and deterioration of the liquid to be sprayed may be accelerated. The deterioration of the liquid to be sprayed may not only affect an effect and efficacy on a user, but also cause a failure in stably spraying the liquid.

The present disclosure provides beauty equipment that is equipped with a spray and is capable of stably spraying a liquid while the liquid to be sprayed is not affected by heating.

Beauty equipment according to an aspect of the present disclosure includes: a housing including a suction port and a discharge port; a heating unit disposed inside the housing; and a spray including a discharger that discharges an atomized liquid generated by atomizing liquid. The housing includes, inside the housing, a warm air flow channel disposed between the suction port and the discharge port, and a cold air flow channel disposed below the warm air flow channel. The heating unit is disposed in the warm air flow channel, and the spray is disposed in the cold air flow channel.

Beauty equipment according to another aspect of the present disclosure includes: a housing including a suction port and a discharge port; a heating unit disposed inside the housing; and a spray including a discharger that discharges an atomized liquid generated by atomizing liquid. The housing includes, inside the housing, a warm air flow channel disposed between the suction port and the discharge port, a cold air flow channel disposed below the warm air flow channel, and a non-air flow channel disposed below the cold air flow channel. The heating unit is disposed in the warm air flow channel, and the spray is disposed in the non-air flow channel.

Beauty equipment according to another aspect of the present disclosure includes: a housing including a suction port and a discharge port; a heating unit disposed inside the housing; and a spray including a discharger that discharges an atomized liquid generated by atomizing liquid. The housing includes, inside the housing, a warm air flow channel disposed between the suction port and the discharge port, the heating unit is disposed in the warm air flow channel, and the spray is disposed outside the housing.

According to the present disclosure, it is possible to provide beauty equipment that is equipped with a spray and is capable of stably spraying a liquid while the liquid to be sprayed is not affected by heating.

DESCRIPTION OF EMBODIMENTS

Hereinafter, exemplary embodiments will be described in detail with reference to the drawings. However, detailed descriptions more than necessary may be omitted. For example, detailed descriptions of already well-known matters or repeated descriptions of substantially the same configurations may be omitted.

Note that the accompanying drawings and the following description are provided to help a person skilled in the art fully understand the present disclosure, and are not intended to limit subject matters described in the claims.

Hereinafter, beauty equipment (hair care device 1A) according to the present exemplary embodiment will be described with reference to FIGS. 1 to 5D.

1. Configuration

First, a configuration of hair care device 1A according to the present exemplary embodiment will be described.

Hair care device 1A according to the present exemplary embodiment is an example of beauty equipment according to the present disclosure, and is a hair dryer in the present exemplary embodiment.

Figure 1:
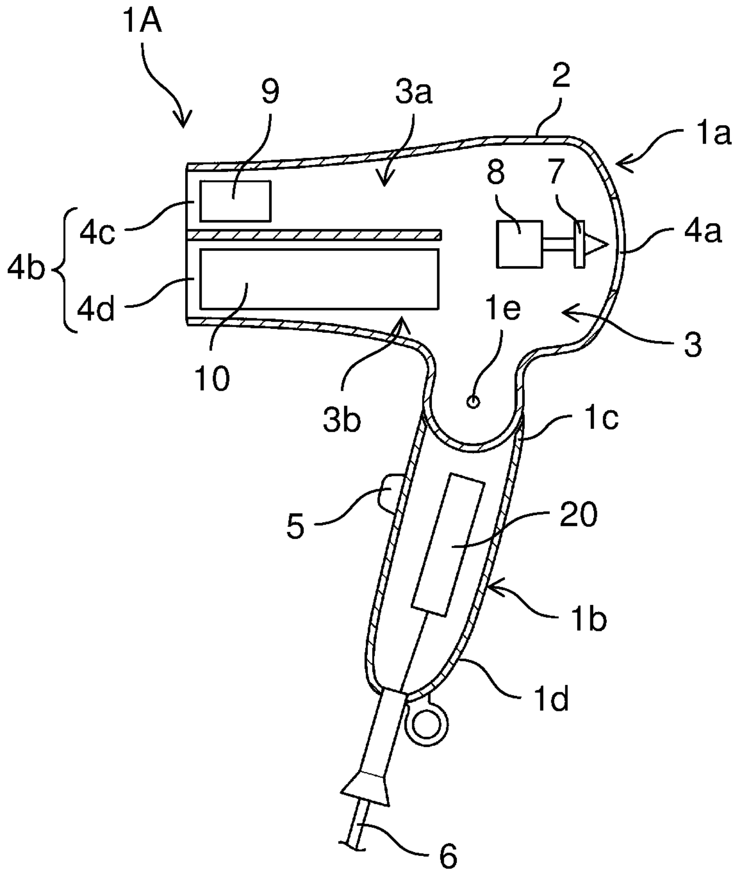
FIG. 1 is a diagram illustrating a basic configuration of beauty equipment (a hair care device) according to one exemplary embodiment.

FIG. 1 is a diagram illustrating a basic configuration of the beauty equipment (hair care device 1A) according to the present exemplary embodiment. As illustrated in FIG. 1, hair care device 1A includes body 1*a* and grip 1*b*. Body 1*a* has housing 2 constituting an outer frame, and cavity 3 is formed in housing 2. In cavity 3, air blow flow channel 3*a* is formed as a warm air flow channel from suction port 4*a* on one side (a right side in FIG. 1) to discharge port 4*b* on the other side (a left side in FIG. 1) in a longitudinal direction (a left-right direction in FIG. 1).

Grip 1*b* as a portion gripped in a user's hand is coupled to a lower portion of housing 2 in a direction intersecting the longitudinal direction of body 1*a*. Hair care device 1A is configured such that body 1*a* and grip 1*b* present a substantially T-shaped or substantially L-shaped (in the present exemplary embodiment, substantially T-shaped) appearance in use.

Grip 1*b* has root 1*c* on a body 1*a* side and tip 1*d*. Sliding power switch 5 is provided on a side surface of grip 1*b*, and power cord 6 is pulled out from a protrusion end (tip 1*d*) of grip 1*b*. Further, grip 1*b* is rotatably coupled to body 1*a* via coupling part 1*e* at root 1*c*. As a result, hair care device 1A can be folded to a position where tip 1*d* lies along body 1*a*.

Further, fan 7 and motor 8 which are examples of an air blower are disposed on an upstream side (a side close to suction port 4*a*) in air blow flow channel 3*a* in body 1*a*.

Heater 9 which is an example of a heating unit that heats air blown from fan 7 is disposed on a downstream side of fan 7 (a side closer to discharge port 4*b* than fan 7). Heater 9 is formed, for example, by winding and disposing an electric resistor having a strip shape and a corrugated plate shape along an inner periphery of air blow flow channel 3*a*.

Further, on a lower side of (below) air blow flow channel 3*a*, branch flow channel 3*b* is present as a cold air flow channel provided separately from air blow flow channel 3*a*. In branch flow channel 3*b*, components of spray 10 according to the present exemplary embodiment are disposed. Details of a configuration of spray 10 will be described later with reference to FIG. 2.

Figure 8:
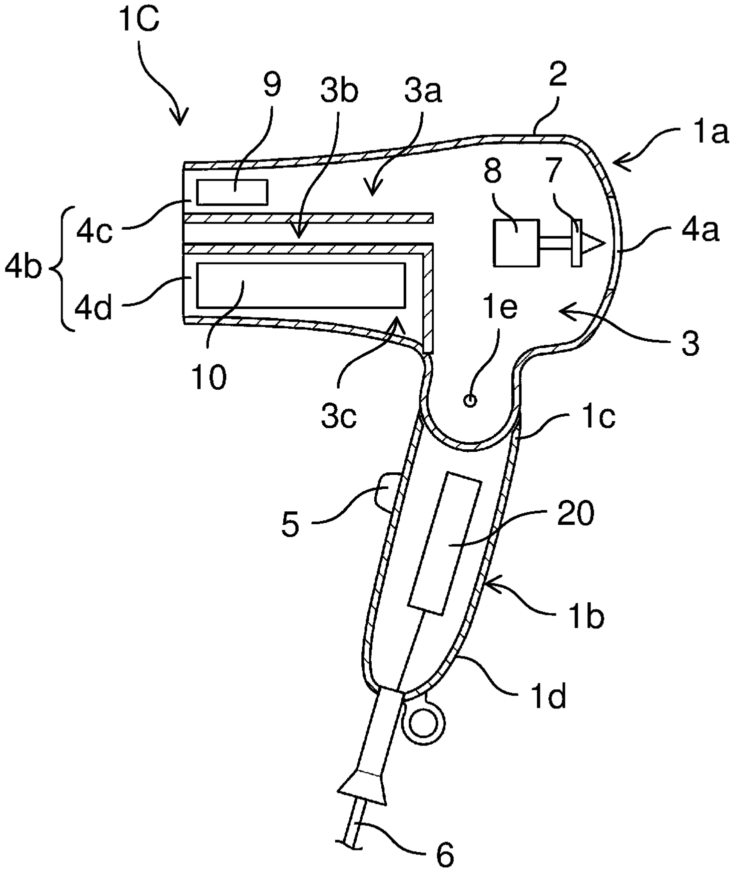
FIG. 8 is a diagram illustrating a basic configuration of beauty equipment (a hair care device) according to another exemplary embodiment.

Further, FIG. 8 is a diagram illustrating a basic configuration of beauty equipment (hair care device 1C) according to another exemplary embodiment. As in hair care device 1C illustrated in FIG. 8, non-air flow channel 3*c* may be present on a further lower side of (below) branch flow channel 3*b* as a cold air flow channel, and components of spray 10 may be disposed in this non-air flow channel 3*c*.

In the present exemplary embodiment, control unit 20 that supplies electric power to and controls operation of components operated by electric power, such as motor 8, heater 9, and spray 10, is disposed inside grip 1*b*. Note that electric circuits for supplying electric power to and controlling the operation of each component may be integrated into one substrate or may be distributed to a plurality of substrates.

Next, spray 10 included in hair care device 1A configured as described above will be described with reference to FIG. 2.

Figure 2:
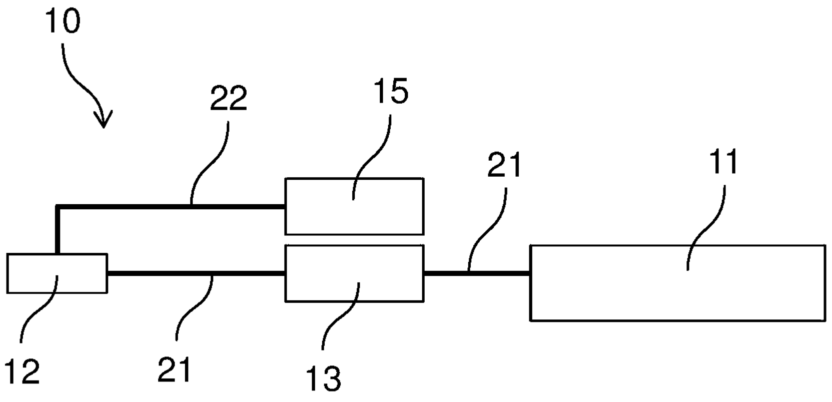
FIG. 2 is a block diagram illustrating a basic configuration of a spray.

FIG. 2 is a block diagram illustrating a basic configuration of spray 10. As illustrated in FIG. 2, spray 10 includes tank 11 as a storage that stores a liquid, two-fluid nozzle 12 as a discharger that discharges an atomized liquid, and liquid feed pump 13 that feeds a liquid supplied from tank 11 toward two-fluid nozzle 12. In addition, spray 10 further includes air pump 15 connected to two-fluid nozzle 12.

Figure 5A:
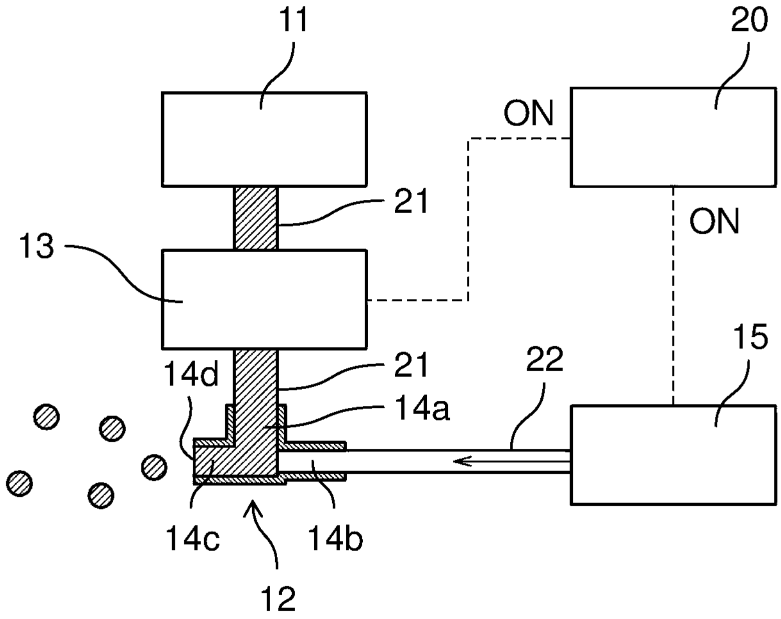
FIG. 5A is a diagram illustrating control of a liquid feed pump and an air pump.

Liquid supply flow channel 14*a* to which a liquid from liquid feed pump 13 is supplied and air supply flow channel 14*b* to which air from air pump 15 is supplied are formed inside two-fluid nozzle 12 (see FIG. 5A).

Further, mixing space 14*c* for mixing a liquid from liquid supply flow channel 14*a* with air from air supply flow channel 14*b* to atomize the liquid is formed inside two-fluid nozzle 12 (see FIG. 5A).

Liquid supply flow channel 14*a* inside two-fluid nozzle 12 and tank 11 communicate by liquid tube 21, and liquid feed pump 13 is disposed in the middle of liquid tube 21.

Tank 11 is, for example, a bag-shaped container (a pouch) formed of a flexible laminate film. Liquid feed pump 13 is, for example, a tube pump that feeds a liquid by sandwiching liquid tube 21 between a roller and a base. Further, liquid feed pump 13 can perform reverse rotation in addition to forward rotation.

On the other hand, air supply flow channel 14*b* inside two-fluid nozzle 12 and air pump 15 communicate by air tube 22.

Then, a liquid mixed and atomized (a mist) in mixing space 14*c* inside two-fluid nozzle 12 is sprayed from mist ejection port 14*d* (see FIG. 5A) to an outside of two-fluid nozzle 12.

2. Operation

Basic operation of hair care device 1A configured as described above will be described.

When a user turns on sliding power switch 5, electric power is supplied to control unit 20 through power cord 6, and control unit 20 is driven.

Driven control unit 20 causes a current to flow through a drive motor (a liquid feed pump drive motor) that drives liquid feed pump 13 and a drive motor (an air pump drive motor) that drives air pump 15. By supplying a current to these drive motors, a liquid in tank 11 is supplied to two-fluid nozzle 12, and air is supplied from air pump 15 to two-fluid nozzle 12. As a result, the liquid is atomized in two-fluid nozzle 12 and discharged from two-fluid nozzle 12 as a mist of a hair care agent containing an oil, a medical agent, and the like (see FIG. 5A).

Further, in a case where power switch 5 is turned on, electric power is supplied to motor 8 and heater 9, and motor 8 is rotationally driven, whereby fan 7 is rotated to form an air flow. Specifically, when air flowing into air blow flow channel 3*a* from an outside through suction port 4*a* passes through air blow flow channel 3*a* and is discharged from discharge port 4*b* to the outside, the air flow is formed. Further, when electric power is supplied to heater 9, the air blown by fan 7 is heated, blown out as warm air from warm air discharge port 4*c* to the outside, and supplied to user's hair. At this time, as described above, the mist discharged from mist discharge port 4*d* to the outside is supplied to the user's hair along with the air flow discharged from discharge port 4*b* to the outside.

Figure 3A:
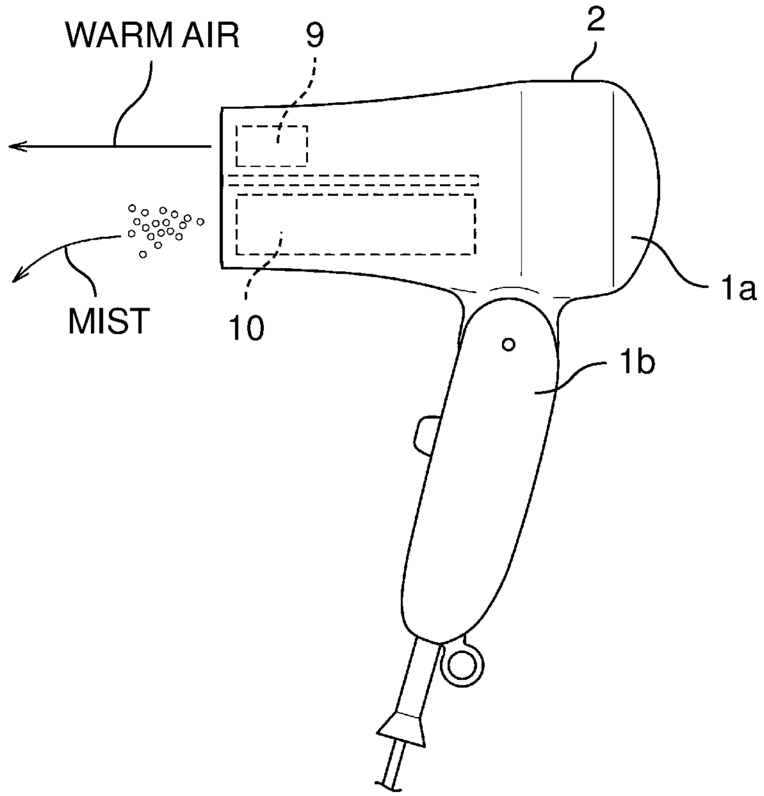
FIG. 3A is a diagram illustrating an orientation (a horizontal orientation) during use of the beauty equipment (the hair care device).
Figure 3B:
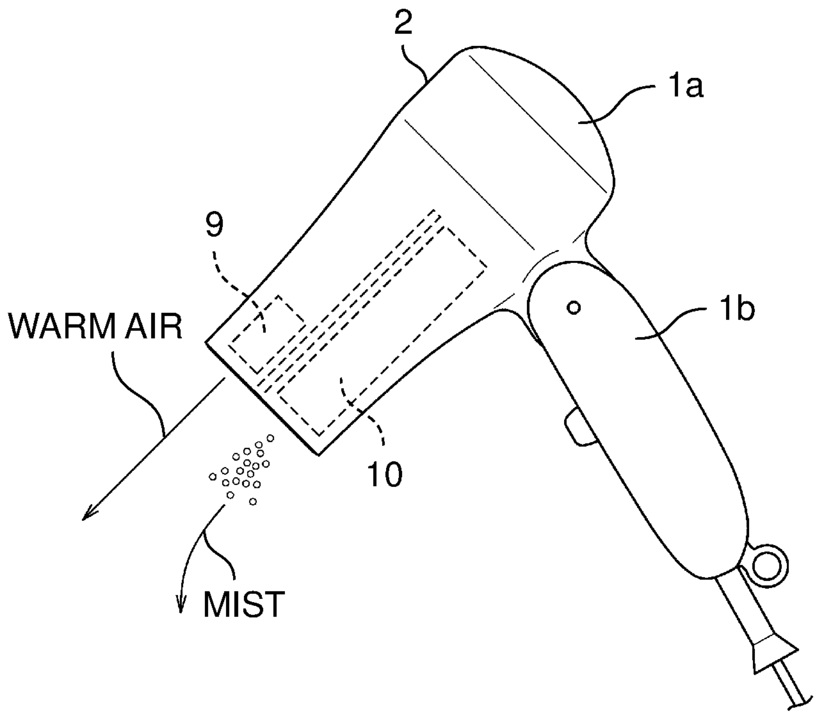
FIG. 3B is a diagram illustrating an orientation (a downward orientation) during use of the beauty equipment (the hair care device).

FIG. 3A is a diagram illustrating an orientation (a horizontal orientation) during use of the beauty equipment (hair care device 1A). FIG. 3B is a diagram illustrating an orientation (a downward orientation) during use of the beauty equipment (hair care device 1A).

In hair care device 1A according to the present exemplary embodiment, heater 9 (air blow flow channel 3*a*) is disposed inside housing 2, and spray 10 (branch flow channel **3*b*) is disposed on a lower side of heater 9 (air blow flow channel 3*a*) in view of the orientation during use of hair care device 1A illustrated in FIGS. 3A and 3**B.

As illustrated in FIGS. 3A and 3B, while the warm air blown out from warm air discharge port **4*c* to the outside of hair care device 1A has straightness, the mist blown out from mist discharge port 4*d* to the outside of hair care device 1**A tends to fall due to gravity.

Therefore, by disposing spray 10 on the lower side of heater 9, hair care device 1A can suppress mixing of the mist that tends to fall due to gravity with the warm air, and can prevent a flying mist from being heated by the warm air.

Operation Control of Spray

Figure 4A:
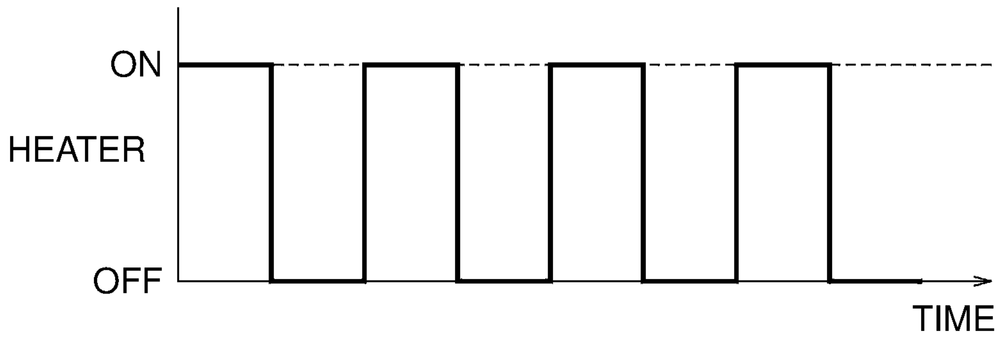
FIG. 4A is a diagram illustrating ON and OFF control of a heater.
Figure 4B:
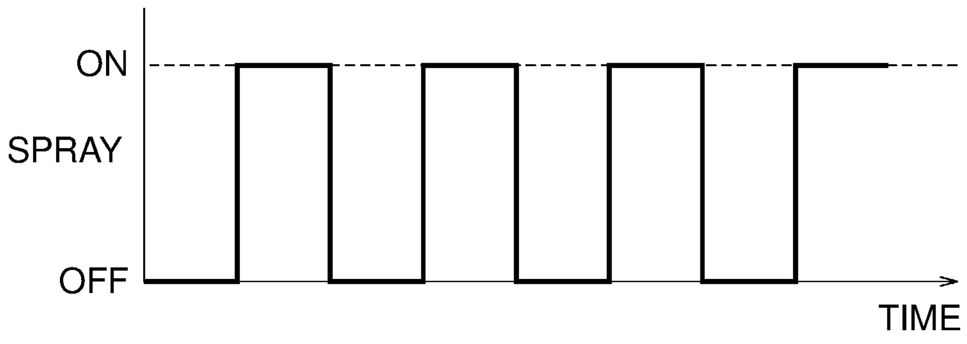
FIG. 4B is a diagram illustrating ON and OFF control of a spray.

FIG. 4A is a diagram illustrating ON and OFF control of heater 9, and FIG. 4B is a diagram illustrating ON and OFF control of spray 10. Times on horizontal axes in FIGS. 4A and 4B correspond to each other.

As illustrated in FIGS. 4A and 4B, in the present exemplary embodiment, when heater 9 is off, spray 10 is turned on, and a mist is sprayed from spray 10.

On the other hand, when heater 9 is on, spray 10 is turned off, and a mist is not sprayed from spray 10.

In other words, in the present exemplary embodiment, heater 9 is controlled such that a temperature of warm air discharged from air blow flow channel **3*a* is lower when spray 10 performs spray operation than when spray 10** does not perform the spray operation.

By controlling on and off of heater 9 and spray 10 in this manner, hair care device 1A can prevent the flying mist from being heated by the warm air even when the user moves hair care device 1A greatly.

Both the time during which spray 10 is on and the time during which spray 10 is off are, for example, 3 seconds to 10 seconds.

Operation Control of Spray after End of Spray Operation

FIGS. 5A to 5D are diagrams illustrating control of liquid feed pump 13 and air pump 15.

As illustrated in FIG. 5A, during the spray operation by spray 10, both liquid feed pump 13 and air pump 15 are driven by control unit 20, and the mist is sprayed from two-fluid nozzle 12. During the spray operation by spray 10, liquid feed pump 13 is operated in forward rotation.

Figure 5B:
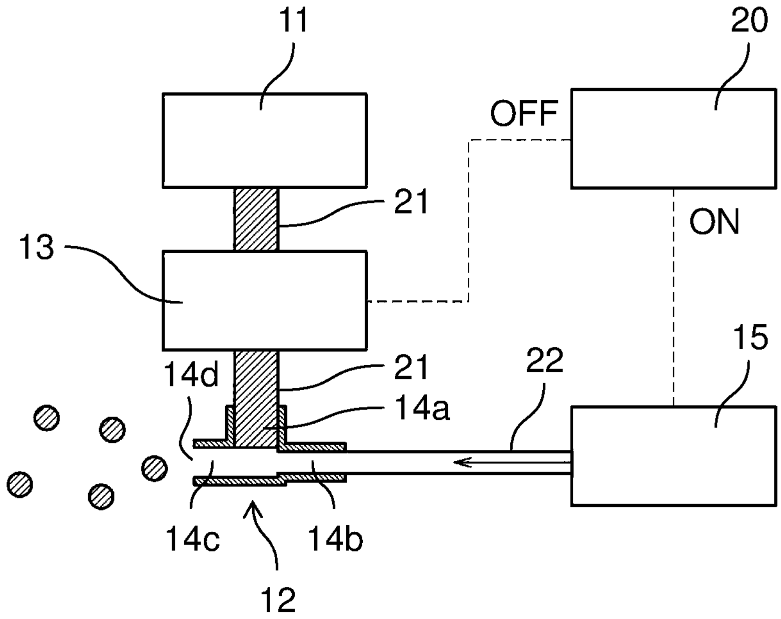
FIG. 5B is a diagram illustrating the control of the liquid feed pump and the air pump.

As illustrated in FIG. 5B, immediately after an end of the spray operation by spray 10, only air pump 15 is driven by control unit 20, and a liquid remaining inside two-fluid nozzle 12 is discharged as a mist to the outside of two-fluid nozzle 12.

Figure 5C:
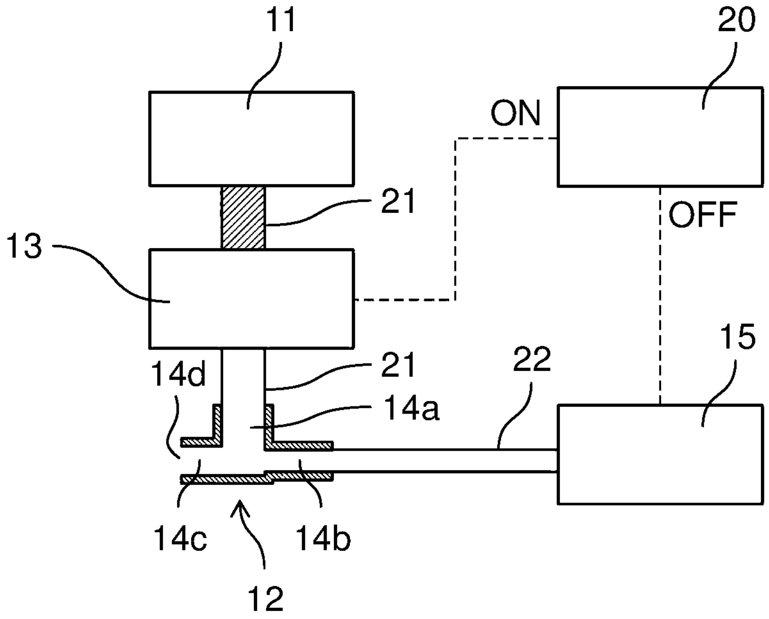
FIG. 5C is a diagram illustrating the control of the liquid feed pump and the air pump.

Thereafter, as illustrated in FIG. 5C, liquid feed pump 13 is driven by control unit 20 in reverse rotation operation, and the liquid remaining inside two-fluid nozzle 12 is returned to a tank 11 side to collect the liquid.

Figure 5D:
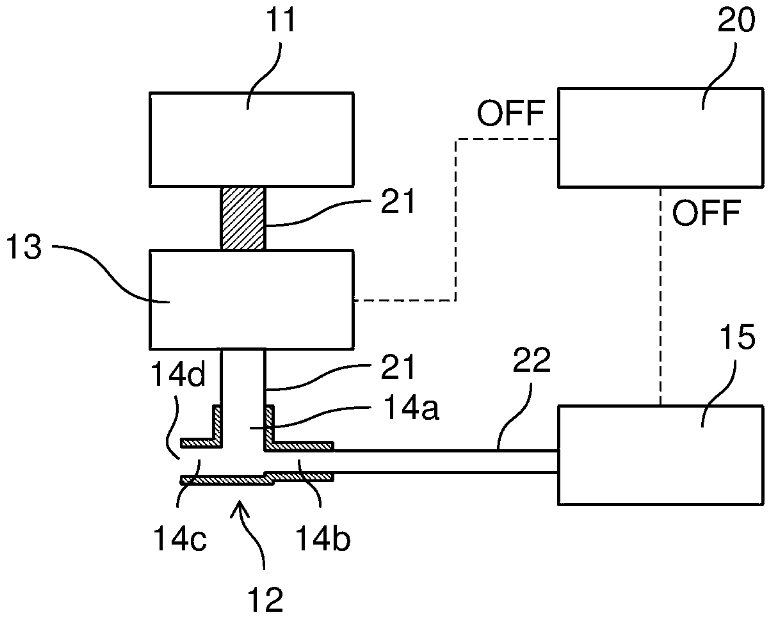
FIG. 5D is a diagram illustrating the control of the liquid feed pump and the air pump.

Thereafter, as illustrated in FIG. 5D, driving of liquid feed pump 13 by control unit 20 is stopped.

As described above, hair care device 1A controls on and off of liquid feed pump 13 and air pump 15 after the end of the spray operation by spray 10. As a result, hair care device 1A can remove a liquid adhering to two-fluid nozzle 12, and can suppress clogging of two-fluid nozzle 12 with the liquid.

3. Effects and the Like

Hereinafter, operational effects according to the present exemplary embodiment will be described.

(1) In the present exemplary embodiment, hair care device 1A includes housing 2 having suction port **4*a* and discharge port 4*b*, heater 9 disposed inside housing 2, and spray 10 having two-fluid nozzle 12 that discharges an atomized liquid. Housing 2 includes air blow flow channel 3*a* disposed between suction port 4*a* and discharge port 4*b*, and branch flow channel 3*b* disposed on the lower side of air blow flow channel 3*a* inside. Heater 9 is disposed in air blow flow channel 3*a*, and spray 10 is disposed in branch flow channel 3*b***.

Here, hair care device 1A is an example of the beauty equipment according to the present disclosure, heater 9 is an example of the heating unit according to the present disclosure, and two-fluid nozzle 12 is an example of the discharger according to the present disclosure. Further, air blow flow channel **3*a* is an example of the warm air flow channel according to the present disclosure, and branch flow channel 3*b*** is an example of the cold air flow channel according to the present disclosure.

Further, as in hair care device 1C illustrated in FIG. 8, non-air flow channel **3*c* may be present on the further lower side of branch flow channel 3*b*, and spray 10 may be disposed in non-air flow channel 3*c***.

By disposing spray 10 in a flow channel different from a flow channel of heater 9, hair care device 1A and hair care device 1C can prevent spray 10 from being heated by warm air generated by heater 9, and can suppress deterioration of a liquid.

Further, by disposing spray 10 on the lower side of heater 9, hair care device 1A and hair care device 1C can suppress mixing of the mist that tends to fall due to gravity with the warm air, and can prevent the flying mist from being heated by the warm air. In other words, hair care device 1A and hair care device 1C are beauty equipment equipped with spray 10, and can stably spray a liquid while the liquid to be sprayed is not affected by heating.

(2) In hair care device 1A and hair care device 1C, heater 9 is controlled such that the temperature of the warm air discharged from air blow flow channel **3*a* is lower when spray 10 performs the spray operation than when spray 10** does not perform the spray operation.

By controlling heater 9 in this manner, hair care device 1A and hair care device 1C can prevent the flying mist from being heated by the warm air even when the user moves hair care device 1A greatly. Note that similar control may be performed in hair care device 1B to be described later, and therefore, hair care device 1B to be described later can also achieve effects similar to those of hair care device 1A and hair care device 1C.

(3) In hair care device 1A and hair care device 1C, the discharger of spray 10 includes two-fluid nozzle 12, and spray 10 has air pump 15 connected to two-fluid nozzle 12. Air pump 15 is controlled to discharge the liquid remaining inside two-fluid nozzle 12 to the outside of two-fluid nozzle 12 after the end of the spray operation of spray 10.

Hair care device 1A and hair care device 1C can remove the liquid remaining in air supply flow channel **14*b* and mist ejection port 14*d* of two-fluid nozzle 12 by controlling air pump 15 after the end of the spray operation by spray 10 as described above. Therefore, hair care device 1A and hair care device 1C can suppress clogging of two-fluid nozzle 12 with the liquid. Note that similar control may be performed in hair care device 1B to be described later, and therefore, hair care device 1B to be described later can also achieve effects similar to those of hair care device 1A and hair care device 1**C.

(4) In hair care device 1A and hair care device 1C, spray 10 includes tank 11 that stores a liquid, and liquid feed pump 13 that can perform forward rotation operation and reverse rotation operation. Liquid feed pump 13 is operated in reverse rotation to return the liquid remaining inside two-fluid nozzle 12 to the tank 11 side after the end of the spray operation of spray 10. Here, tank 11 is an example of the storage according to the present disclosure.

Hair care device 1A and hair care device 1C can remove the liquid remaining in liquid supply flow channel 14*a* of two-fluid nozzle 12 by controlling liquid feed pump 13 after the end of the spray operation by spray 10 as described above. Therefore, hair care device 1A and hair care device 1C can suppress clogging of two-fluid nozzle 12 with the liquid. Note that similar control may be performed in hair care device 1B to be described later, and therefore, hair care device 1B to be described later can also achieve effects similar to those of hair care device 1A and hair care device 1C.

Another Exemplary Embodiment

Hereinafter, beauty equipment (hair care device 1B) according to another exemplary embodiment will be described with reference to FIGS. 6 and 7.

Note that the same parts as those of hair care device 1A according to the exemplary embodiment illustrated in FIGS. 1 and 2 are denoted by the same reference numerals, and detailed descriptions thereof will be omitted.

Figure 6:
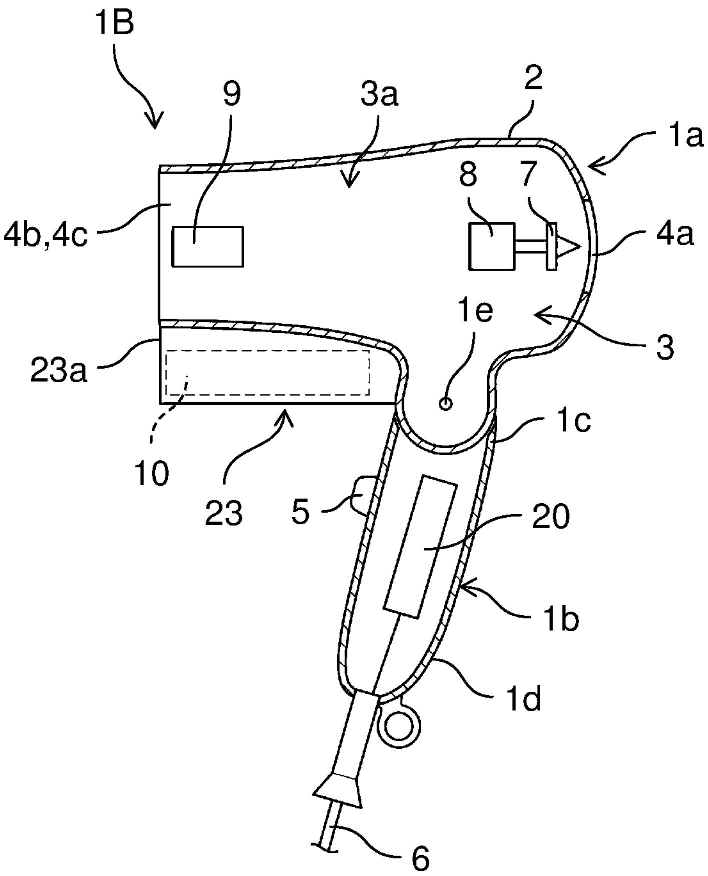
FIG. 6 is a diagram illustrating a basic configuration of beauty equipment (a hair care device) according to another exemplary embodiment.

FIG. 6 is a diagram illustrating a basic configuration of beauty equipment (hair care device 1B) according to another exemplary embodiment. As illustrated in FIG. 6, in hair care device 1B, heater 9 is disposed in air blow flow channel 3*a* (a warm air flow channel) formed inside housing 2, and spray 10 is disposed in sub housing 23 outside housing 2. These sub housing 23 and spray 10 are disposed on a lower side of (below) housing 2 and heater 9. Further, mist ejection port 23*a* is disposed in sub housing 23.

Figure 7:
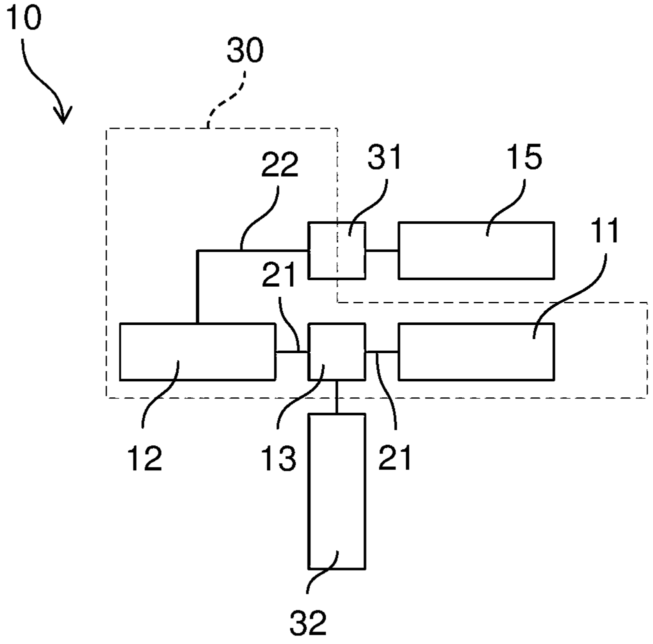
FIG. 7 is a block diagram illustrating a basic configuration of a spray.

FIG. 7 is a block diagram illustrating a basic configuration of spray 10 according to another exemplary embodiment. As illustrated in FIG. 7, spray 10 according to another exemplary embodiment includes connector 31 for connecting air pump 15 and motor (a liquid feed pump drive motor) 32 that drives liquid feed pump 13. Among the components of spray 10 according to another exemplary embodiment, two-fluid nozzle 12, liquid feed pump 13, tank 11, and connector 31 are disposed in replacement cartridge 30 that is replaceable.

Hereinafter, operational effects according to another exemplary embodiment illustrated in FIGS. 6 and 7 will be described.

(1) In the present exemplary embodiment, hair care device 1B includes housing 2 having suction port 4*a* and discharge port 4*b*, heater 9 disposed inside housing 2, and spray 10 having two-fluid nozzle 12 that discharges an atomized liquid. Housing 2 includes air blow flow channel 3*a* disposed between suction port 4*a* and discharge port 4*b* inside. Heater 9 is disposed in air blow flow channel 3*a*, and spray 10 is disposed outside housing 2. Here, hair care device 1B is an example of the beauty equipment according to the present disclosure, heater 9 is an example of the heating unit according to the present disclosure, two-fluid nozzle 12 is an example of the discharger according to the present disclosure, and air blow flow channel 3*a* is an example of the warm air flow channel according to the present disclosure.

By disposing heater 9 and spray 10 at a farther distance, hair care device 1B can prevent spray 10 from being heated by warm air generated by heater 9, and can suppress deterioration of a liquid. In other words, hair care device 1B is beauty equipment equipped with spray 10, and can stably spray a liquid while the liquid to be sprayed is not affected by heating.

(2) In hair care device 1B, spray 10 further includes tank 11 that stores a liquid, liquid feed pump 13 that feeds the liquid from tank 11 toward two-fluid nozzle 12, and liquid feed pump drive motor 32 that drives liquid feed pump 13. Spray 10 has replacement cartridge 30 that is replaceable, and two-fluid nozzle 12, tank 11, and liquid feed pump 13 are disposed in replacement cartridge 30. Here, tank 11 is an example of the storage according to the present disclosure, and liquid feed pump drive motor 32 is an example of the motor according to the present disclosure.

Hair care device 1B can suppress continuous liquid heating due to long-term retention of a liquid such as a hair care agent inside hair care device 1B, and can suppress the deterioration of the liquid.

In other words, the beauty equipment according to the present disclosure is a hair dryer equipped with a mist spray device using a nozzle, the hair dryer includes a warm air part that emits warm air and a cold air part that emits cold air, the warm air part has a warm air port, the cold air part has a cold air port, and the mist spray device is installed in the cold air part. In the beauty equipment according to the present disclosure, a substance storage that stores a substance to be mixed with a mist discharged from the mist spray device described above is disposed at a place that is not warmed by a warming part of the hair dryer. Further, the cold air part described above includes the substance storage, a pump that mixes and feeds a mist and a substance, and a fluid nozzle that ejects the mist mixed with the-substance fed from the pump to an outside of the hair dryer. Further, the substance storage described above is a replaceable cartridge. Further, the pump described above has a substance micronizer that micronizes a substance to be mixed. Further, the cold air part described above is disposed on a lower side of the warm air part. Further, the cold air part described above is a replaceable cartridge. Furthermore, the fluid nozzle described above has a substance micronizer that micronizes a substance to be mixed.

Note that since the above-described exemplary embodiments illustrate the technique in the present disclosure, various changes, replacements, additions, omissions, and the like can be made within the scope of the claims or equivalents thereof.

INDUSTRIAL APPLICABILITY

The present disclosure is applicable to beauty equipment equipped with a spray, and the present disclosure is applicable, for example, to a hair care device, a hair dryer, and the like.

REFERENCE MARKS IN THE DRAWINGS

1A hair care device (beauty equipment)
1B hair care device (beauty equipment)
1C hair care device (beauty equipment)
1*a* body
1*b* grip
1*c* root
1*d* tip

1*e* coupling part
2 housing
3 cavity
3*a* air blow flow channel (warm air flow channel)
3*b* branch flow channel (cold air flow channel)
3*c* non-air flow channel
4*a* suction port
4*b* discharge port
4*c* warm air discharge port
4*d* mist discharge port
5 power switch
6 power cord
7 fan
8 motor
9 heater (heating unit)
10 spray
11 tank (storage)
12 two-fluid nozzle (discharger)
13 liquid feed pump
14*a* liquid supply flow channel
14*b* air supply flow channel
14*c* mixing space
14*d* mist ejection port
15 air pump
20 control unit
21 liquid tube
22 air tube
23 sub housing
23*a* mist ejection port
30 replacement cartridge
31 connector
32 liquid feed pump drive motor (motor)

The invention claimed is:

1. Beauty equipment comprising:
a housing including a suction port and a discharge port;
a heating unit disposed inside the housing;
a spray including a discharger that discharges an atomized liquid generated by atomizing liquid; and
a grip portion to be gripped by a user's hand coupled to the housing, wherein:
the housing includes, inside the housing:
a warm air flow channel disposed between the suction port and the discharge port and having a warm air port;
a cold air flow channel disposed closer to the grip portion than the warm air flow channel and having a cold air port; and
a non-air flow channel disposed closer to the grip portion than the cold air flow channel and having a discharge port, and
the heating unit is disposed in the warm air flow channel,
the spray is disposed in the non-air flow channel such that the atomized liquid is discharged from the discharge port, not from the cold air port and the warm air port,
the heating unit is controlled to make a temperature of warm air discharged from the warm air flow channel lower when the spray performs spray operation than when the spray does not perform the spray operation, and
the heating unit is controlled such that the heating unit is turned off when the spray performs the spray operation, and the heating unit is turned on when the spray does not perform the spray operation.

2. The beauty equipment according to claim 1, wherein
the discharger includes a two-fluid nozzle,
the spray includes an air pump connected to the two-fluid nozzle, and
the air pump is controlled to discharge liquid remaining inside the two-fluid nozzle to an outside of the two-fluid nozzle after an end of spray operation of the spray.

3. The beauty equipment according to claim 1, wherein
the spray includes a storage that stores the liquid, and a liquid feed pump capable of performing forward rotation operation and reverse rotation operation, and
the liquid feed pump is operated in reverse rotation to return liquid remaining inside the discharger to a storage side after an end of spray operation of the spray.

* * * * *